(12) United States Patent
Okubo et al.

(10) Patent No.: US 7,000,140 B2
(45) Date of Patent: Feb. 14, 2006

(54) DATA PROCESSOR AND DATA PROCESSING SYSTEM

(75) Inventors: Haruyasu Okubo, Tokyo (JP); Atsushi Kiuchi, Higashimurayama (JP); Shigezumi Matsui, Nishitokyo (JP)

(73) Assignee: Renesas Technology Corporation, Tokyo (JP)

( * ) Notice: Subject to any disclaimer, the term of this patent is extended or adjusted under 35 U.S.C. 154(b) by 649 days.

(21) Appl. No.: 09/993,704

(22) Filed: Nov. 27, 2001

(65) Prior Publication Data

US 2002/0073352 A1      Jun. 13, 2002

(30) Foreign Application Priority Data

Nov. 29, 2000 (JP) .............................. 2000-362668

(51) Int. Cl.
  *G06F 1/32* (2006.01)
(52) U.S. Cl. ..................... 713/601; 713/324; 713/600
(58) Field of Classification Search ................ 713/300, 713/320, 322, 324, 600, 601
See application file for complete search history.

(56) References Cited

U.S. PATENT DOCUMENTS 6,266,776 B1 * 7/2001 Sakai .......................... 713/300
6,665,802 B1 * 12/2003 Ober ........................... 713/320
6,754,837 B1 * 6/2004 Helms ......................... 713/322

FOREIGN PATENT DOCUMENTS

JP          03-105408          9/1989

* cited by examiner

Primary Examiner—Lynne H. Browne
Assistant Examiner—Paul Yanchus
(74) Attorney, Agent, or Firm—Reed Smith LLP; Stanley P. Fisher, Esq.; Juan Carlos A. Marquez, Esq.

(57) ABSTRACT

This data processor can satisfy both requests of a fast transition from a low power consumption state to an operating state and low power consumption, and a data processor has a program running state, a standby mode, a light standby mode, and a sleep mode. In the sleep mode, the supply of a synchronizing clock signal to a central processing unit (CPU) is stopped and the synchronizing clock signal is supplied to other circuit modules. In the standby mode, the frequency multiplication and frequency operation of a clock pulse generator are suspended and the supply of the synchronizing clock signal to the CPU and other circuit modules is stopped. In the light standby mode, the frequency multiplication and frequency division operation of the clock pulse generator are enabled and the supply of the synchronizing clock signal to the CPU and other circuit modules is stopped. In the light standby mode, the transition of the CPU to an instruction executable state is faster than in the standby mode and the lower power consumption than in the sleep mode is obtained.

22 Claims, 9 Drawing Sheets

| SBY | LTSBY | OPERATION MODE TRANSITION WHEN SLEEP INSTRUCTION IS EXECUTED |
|---|---|---|
| 0 | 0 | SLEEP MODE |
| 0 | 1 | LIGHT STANDBY MODE |
| 1 | 0 | STANDBY MODE |
| 1 | 1 | STANDBY MODE |

FIG. 6(A)
DATA PROCESSING REQUEST

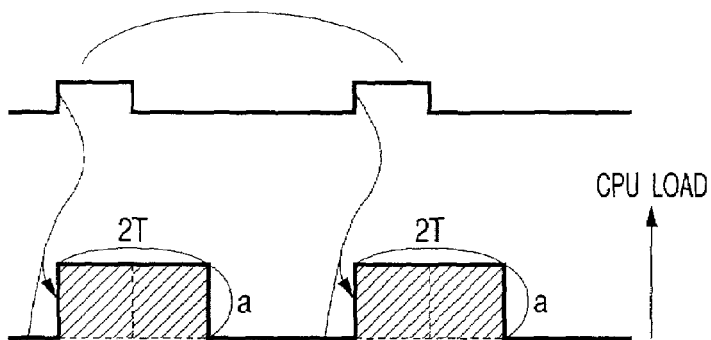

FIG. 6(B)
DATA THROUGHPUT ORDINARY

FIG. 6(C)
(POWER CONSUMPTION LEVEL IN PROGRAM RUNNING STATE)
(POWER CONSUMPTION LEVEL IN SLEEP MODE)
(POWER CONSUMPTION LEVEL IN LIGHT STANDBY MODE)

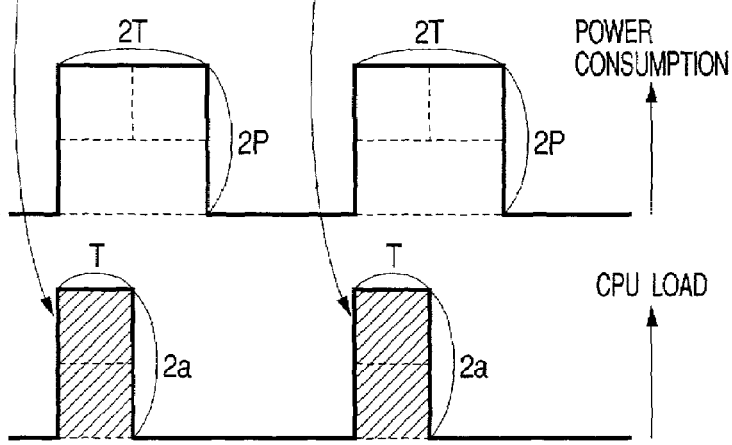

FIG. 6(D)
DATA PERFORMANCE IMPROVEMENT

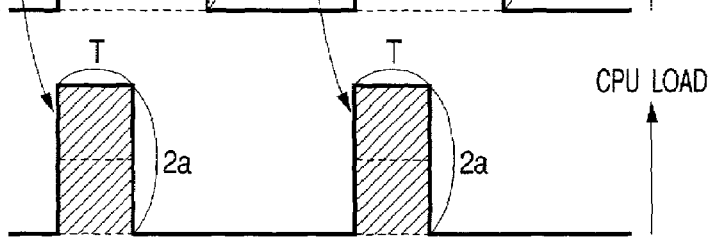

FIG. 6(E)
(POWER CONSUMPTION LEVEL IN PROGRAM RUNNING STATE)
(POWER CONSUMPTION LEVEL IN SLEEP MODE)
(POWER CONSUMPTION LEVEL IN LIGHT STANDBY MODE)

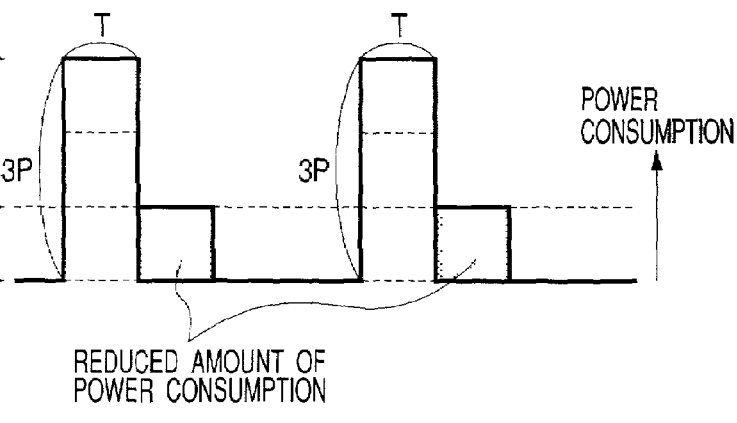

REDUCED AMOUNT OF POWER CONSUMPTION

TIME

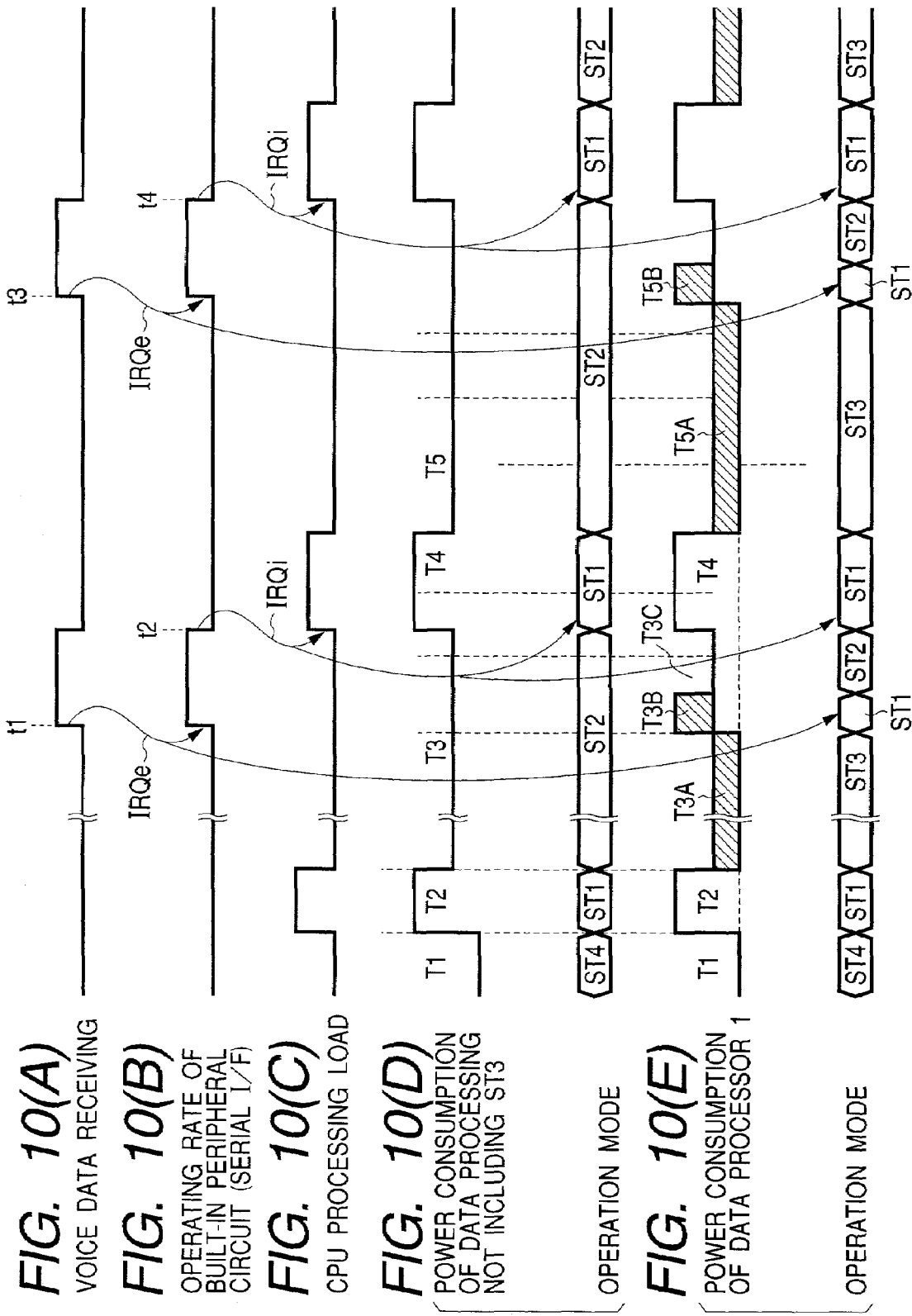

DATA PROCESSOR AND DATA PROCESSING SYSTEM

BACKGROUND OF THE INVENTION

The present invention relates to a data processor and more particularly to its low power consumption mode, for example, an effective art that applies to a data processing system such as a cellular phone that operates by a battery power supply.

A data processor builds in a clock pulse generator that generates a synchronizing clock signal frequency-multiplies and frequency-divides a clock signal formed by a ring oscillator using an oscillator or a clock signal supplied externally, then generates the synchronizing clock signal. A CPU (central processing unit) and an SCI (serial interface circuit) built in the data processor receive the synchronizing clock signal and perform a synchronous operation. A standby mode and a sleep mode are included as low power consumption modes in such data processor. For example, in the standby mode, the operation of a PLL (phase-locked loop) circuit for multiplying a frequency provided in the clock pulse generator or a frequency divider for frequency division is suspended and changes of the synchronizing clock signal inside the data processor are all stopped. In the sleep mode, the input operation of a synchronizing clock input circuit of the CPU is suppressed and the CPU operation is suspended, then the synchronizing clock signal is supplied to another circuit, such as a peripheral circuit, and the circuit can be operated.

For example, there is "Japanese Unexamined Patent Publication No. Hei 3 (1991)-105408 as a document that describes low power consumption modes of electronic equipment. This publication describes an art that controls the supply of a clock signal to a CPU and a peripheral circuit using an oscillation-controlled circuit, and according to a description of the publication, to stop the supply of the clock signal, the connection of clock wiring is disconnected or oscillation itself is stopped.

SUMMARY OF THE INVENTION

To give the highest priority to the low power consumption of a data processor, a standby mode ought be set. However, the operating stabilization of a PLL circuit must be awaited until a CPU (central processing unit) can be made to execute an instruction from the state, and an operation mode in which the transition time is shortened was not considered in the past. Adversely, if the highest priority is given to an immediate transition of the CPU from a low power consumption state to an instruction executable state, a sleep mode ought be set. However, if an operable peripheral circuit needs not to be operated quite at this time, a clock buffer or a clock driver consumes useless power in a clock supply path to the peripheral circuit. Accordingly, the effect of the low power consumption will be lessened.

An object of the present invention is to provide a data processor having an operation mode in which the transition of a CPU into an instruction executable state is faster than a standby mode that all stops changes of a synchronizing clock signal inside the data processor and that can further decrease power consumption than a sleep mode in which only the CPU operation is suspended.

A further object of the present invention is to provide a data processor that can satisfy both requirements of a rapid transition from a low power consumption state to an operating state and low power consumption.

Another object of the present invention is to provide a data processing system, such as a portable terminal unit, that satisfies both requirements of a rapid transition from a low power consumption state to an operating state and low power consumption.

This and other objects, and new characteristics of the present invention will be evident from a description and appended drawings of this specification.

An outline of a typical invention among the inventions disclosed in this application is briefly described as follows:

[1] A data processor according to a first aspect of the present invention is provided with a CPU that can execute an instruction, a clock pulse generator that enables frequency multiplication and frequency division operation to a clock signal and outputs a synchronizing clock signal, and other circuit modules in a semiconductor chip, and has a program running state, a standby mode, a light standby mode, and a sleep mode. In the sleep mode, the supply of the synchronizing clock signal to the CPU is stopped and the synchronizing clock signal is supplied to other circuit modules. In the standby mode, the frequency multiplication and frequency division operation in the clock pulse generator are suspended and the supply of the clock pulse signal to the CPU and other circuit modules is stopped. In the light standby mode, the frequency multiplication and frequency division operation in the clock pulse generator are enabled and the supply of the synchronizing clock signal to the CPU and other circuit modules is stopped.

In the light standby mode, the transition of a CPU into an instruction executable state is more rapid than in a standby mode that all stops changes of a synchronizing clock signal inside a data processor are stopped and power consumption can further be decreased than in a sleep mode in which only the CPU operation is suspended. Accordingly, the data processor can satisfy both requirements of a rapid transition between a low power consumption state and an operating state and low power consumption.

In a specific aspect of the present invention, the data processor is provided with at least a mode control circuit as other circuit modules. This mode control circuit has a control register. The mode control circuit sets the sleep mode in response to a first state of the control register when a predetermined instruction is executed by a CPU and sets the light standby mode in response to a second state of the control register when the predetermined instruction is executed by the CPU, then sets the standby mode in response to a third state of the control register when the predetermined instruction is executed by the CPU. In short, the low power consumption state can be set by the execution of software by the CPU, that is, by the writing of control data to the control register and the execution of a predetermined instruction, such as a sleep instruction.

The mode control circuit ought to perform the transition from a low power consumption state set by software to an instruction executable state in response to an interrupt request. The mode control circuit ought move to the instruction executable state by a CPU in response to an internal interrupt request or external interrupt request for a sleep mode and ought to move to the instruction executable state in response to the external interrupt request for a light standby mode or standby mode.

If power consumption is automatically decreased when a data processor is not operated for a fixed time, the mode control circuit ought to move from a sleep mode to a light standby mode in response to the counting of up to a predetermined value by a timer that is one of other circuit modules. At this time, a DMA (direct memory access)

transfer can be executed by a DMAC (direct memory access controller) that is one of other circuits in the sleep mode as is. Accordingly, if a DMA transfer request is made on the way to the counting operation by the timer, the counting is suppressed in response to the request and the transition into the light standby mode ought to be enabled after the DMA transfer. This can prevent the operation mode from changing into an undesired one while the DMA transfer is being performed in the sleep mode.

A hierarchical clock path, such as an H tree, is assumed to be adopted. At this time, when the supply of a synchronizing clock signal is individually stopped to a CPU, the mode control circuit ought to control the stop of supplying the synchronizing clock signal to the CPU in the sleep mode by the suppression of the input operation in a clock input circuit of the CPU. To stop the supply of clocks to all circuit modules connected to the end of the clock path, the mode control circuit ought to control the stop of supplying the synchronizing clock signal to the CPU and other circuits in the light standby mode by the suppression of the output operation in a clock output circuit of a clock pulse generator. This can suppress the actual condition under which multiple clock buffers or clock drivers arranged in the clock path, such as the H tree, consume useless power in the light standby state.

[2] A data processor according to a second aspect of the present invention is provided with a CPU that can execute an instruction, a clock pulse generator that enables frequency multiplication and frequency division operation to a clock signal and outputs a synchronizing clock signal, and other circuit modules in a semiconductor chip, and is provided with a mode control circuit that controls settings of a first mode, such as at least a sleep mode, and a second mode, such as a light standby mode, as other circuit modules. In the first mode, the supply of the synchronizing clock signal to the CPU is stopped and the synchronizing clock signal is supplied to other circuit modules. In the second mode, the frequency multiplication and frequency division operation are enabled in the clock pulse generator and the supply of the synchronizing clock signal to the CPU and other circuit modules is stopped. In the second mode, such as the light standby mode, the transition of the CPU into an instruction executable state is more rapid than in an operation mode, such as a standby mode, in which changes of the synchronizing clock signal inside the data processor are all stopped, and power consumption can further be decreased than in the first mode, such as the sleep mode, in which only the CPU operation is suspended. At this time, the mode control circuit moves the first operation mode to the second operation mode when there is no operation instruction to the CPU until the predetermined lapse of time after the first mode is set. Therefore, according to the data processor, the power consumption can automatically be decreased when the data processor is not operated for a fixed time. Moreover, in the second mode, such as the light standby mode, because the frequency multiplication and frequency division operation are continued, the transition into the subsequent program executable state is also rapid.

As a specific aspect of the present invention, the predetermined lapse of time ought to be obtained by the counting operation of up to a predetermined value by a timer that is one of other circuit modules. Further, at this time, the DMA transfer by the DMAC that is one of other circuits can be executed in a sleep mode as is. Accordingly, the timer initializes a counted value in response to a DMA transfer request to the DMAC on the way to the counting operation of up to the predetermined value and suppresses substantial counting. Then the timer restarts the counting after the DMA transfer and ought to enable the transition into a light standby mode.

Such low power consumption states as the first mode and the second mode ought to be set by the execution of software by the CPU, that is, the writing of control data to a control register and the execution of a predetermined instruction, such as a sleep instruction. Further, the mode control circuit ought to perform the transition from a low power consumption state set by the software to an operating state in response to an interrupt request.

[3] A data processing unit according to the present invention consists of the data processor, a memory which the CPU of the data processor can access, and a circuit that requests an interrupt from the data processor. When a portable terminal unit, such as a cellular phone, is assumed, a data processing system uses a battery power supply as an operating power supply. This data processing system can satisfy both requirements of a rapid transition from a low power consumption state to an operating state and low power consumption.

BRIEF DESCRIPTION OF THE DRAWINGS

FIG. 6 is a timing chart for showing an example in which the effect of the low power consumption in a light standby mode increases as the data processor of FIG. 1 is made faster;

FIG. 10 is a timing chart for illustrating the transition progress of an operating state of a data processor 1 that changes in response to the operating state of the cellular phone system.

DESCRIPTION OF PREFERRED EMBODIMENTS

Figure 1:
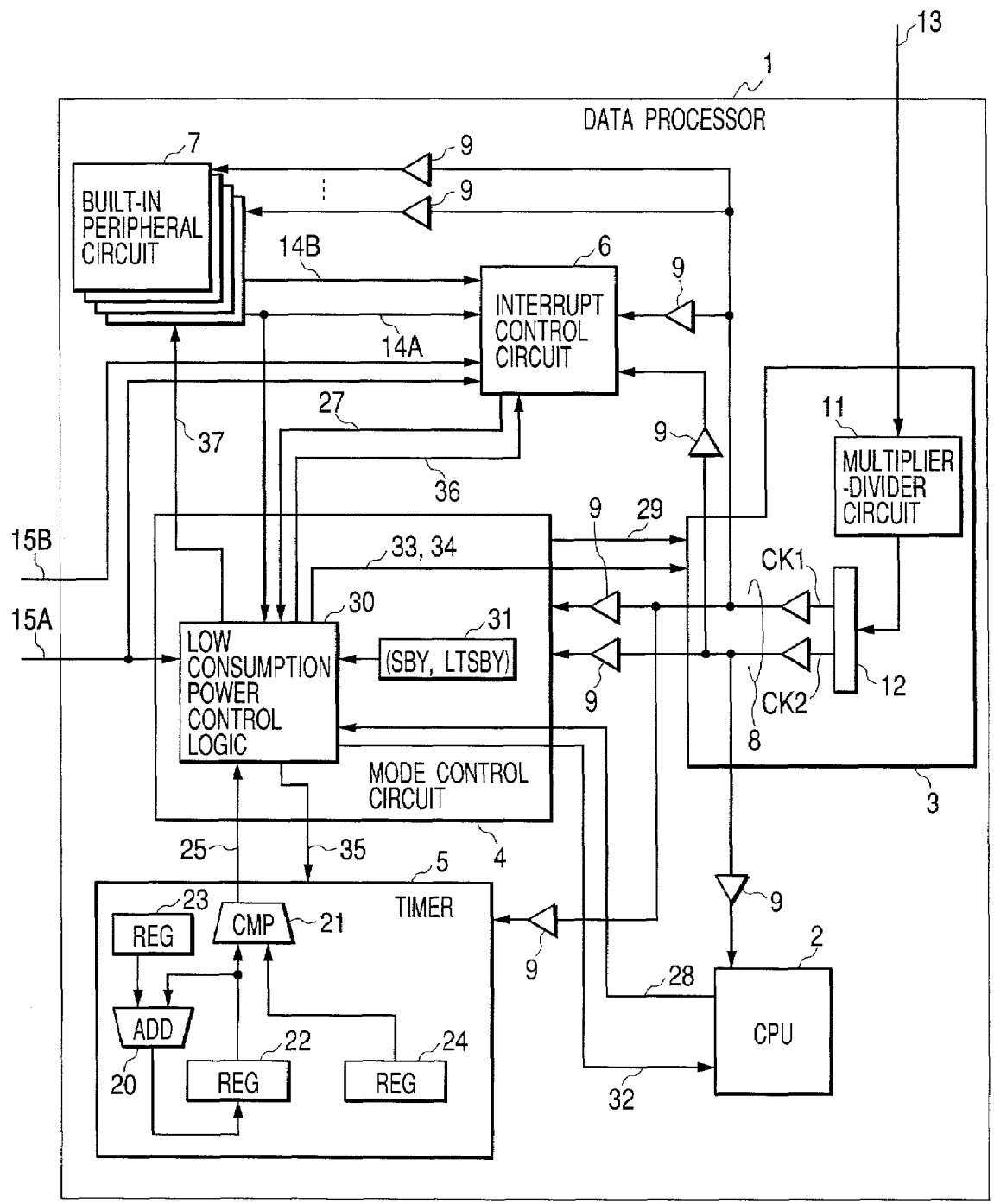
FIG. 1 is a block diagram showing a first example of a data processor according to the present invention.

FIG. 1 shows a first example of a data processor according to the present invention. A data processor 1 shown in the same drawing comprises a CPU (central processing unit) 2 that can execute an instruction, a clock pulse generator 3 that enables frequency multiplication and frequency division operation to a clock signal and outputs synchronizing clock signals CK1, CK2, a mode control circuit 4, a timer 5, an interrupt control circuit 6, and other peripheral circuits 7, and is formed in a semiconductor chip, such as single crystal silicon. The clock pulse generator 3, mode control circuit 4, time 5, interrupt control circuit 6, and other peripheral circuits 7 are arranged in the address space of the CPU 2 and can be accessed by the CPU 2 via an address bus, a data bus, and a control bus of which the illustration is omitted. Clock wiring 8 illustrated in FIG. 1 is laid in an H tree shape and extends over a circuit module at the end, then propagates the synchronizing clock signals CK1, CK2. Multiple clock drivers 9 are arranged on the way to the clock wiring 8.

The CPU 2, mode control circuit 4, timer 5, interrupt control circuit 6, and other peripheral circuits 7 synchronously operate with the synchronizing clock signals CK1, CK2 input to the clock wiring 8. Those CPU 2, mode control circuit 4, timer 5, interrupt control circuit 6, and other peripheral circuits 7 contain circuit portions that can operate asynchronously with the clock signals CK1, CK2, for example, a mode control signal input circuit and an interrupt request signal input circuit.

The CPU 2 fetches an instruction and decodes the fetched instruction, then performs operation processing and operand access in accordance with a decoding result.

The clock pulse generator 3 includes a frequency multiplier-frequency divider circuit 11 and a clock selection circuit 12. The frequency multiplier-frequency divider circuit 11 inputs a clock signal generated by a ring oscillator (not shown) that uses an oscillator or a system clock signal assigned externally as a source clock signal 13 and frequency-multiplies and/or frequency-divides this signal. A desired clock signal is selected from several types of clock signals generated by the frequency multiplier-frequency divider circuit 11 by the clock selection circuit 12 and output as the synchronizing clock signals CK1, CK2. The mode control circuit 4 includes a clock frequency control register (not shown) that can be accessed by the CPU 2, and the clock signal by the clock selection circuit 12 is selected with a clock selection signal 29 that corresponds to the set value of the clock frequency control register.

The interrupt control circuit 6 decides a mask level and a priority level of the input interrupt request signal in accordance with settings of an interrupt mask circuit and an interrupt priority circuit of which the illustration is omitted and asserts (issues) an interrupt signal to the CPU 2 on condition that a decision result is not an interrupt mask object and another interrupt request with a high interrupt priority level is not made. Accordingly, the CPU 2 branches into another instruction execution processing in accordance with the interrupt factor. In the drawing, the interrupt request signal is roughly classified into interrupt request signals 14A, 14B from a built-in peripheral circuit and interrupt request signals 15A, 15B input externally from a data processor. Among them, 14A, 15A indicate non-maskable interrupt request signals.

The timer 5 has an adder (ADD) 20, a comparator (CMP) 21, and registers (REG) 22, 23, 24 that can be accessed by the CPU 2. For example, a counter operation (counting operation) can be realized by setting the register 23 to value 1 and adding the output of the register 22 and the output of the register 23 by the adder 20, then repeating the operation that returns the result to the register 22. The counted value is compared with the set value of the register 24 by the comparator 21 and matching is detected, then a signal (timeout signal) 25 is set at an enable level.

The mode control circuit 4 has typically shown low power consumption control logic 30 and a control register 31 that can be accessed by the CPU 2. The data processor 1 has a standby mode, a light standby mode (second mode), and a sleep mode (first mode) as low power consumption modes. The transition from a program running state by the CPU 2 to the low power consumption mode is not restricted in particular, but is performed in accordance with a set value of the control register 31 when the CPU 2 executes the sleep instruction. Accordingly, the low power consumption control logic 30 inputs a control signal 28 enabled when the CPU 2 executes the sleep instruction, and inputs the set value of the control register 31. The low power consumption control logic 30 performs clock control to the circuit modules 2, 3, 5, 6, 7 using control signals 32 to 37 in accordance with their inputs, thereby controlling the transition into the corresponding low power consumption mode. That is, the control signals 32, 35, 36, 37 control the permission and prohibition of the clock input in the clock input circuit of the corresponding circuit modules. The control signal 33 controls the permission and prohibition of the operation that outputs the clock signals CK1, CK2 from the clock selection circuit 12. The control signal 34 controls the permission and prohibition of the frequency multiplication and frequency division operation of the frequency multiplier-frequency divider circuit 11.

In the sleep mode, the CPU 2 stops the input of the synchronizing clock signal CK2 and permits the input of the synchronizing clock signals CK1, CK2 to other circuit modules 4, 5, 6, 7. In the standby mode, the frequency multiplication and frequency division operation in the frequency multiplier-frequency divider circuit 11 are suspended and the supply of the synchronizing clock signals CK1, CK2 to the CPU 2 and other circuit modules 4, 5, 6, 7 is stopped. Besides, although not shown, the control register 31 includes an operation suspend control bit that steadily instructs operation suspend every built-in peripheral circuit. When the operation suspend control bit is set, the corresponding built-in peripheral circuit prohibits the input of the synchronizing clock signal in both a low power consumption mode and a program running state, thereby suppressing the circuit operation.

Figure 2:
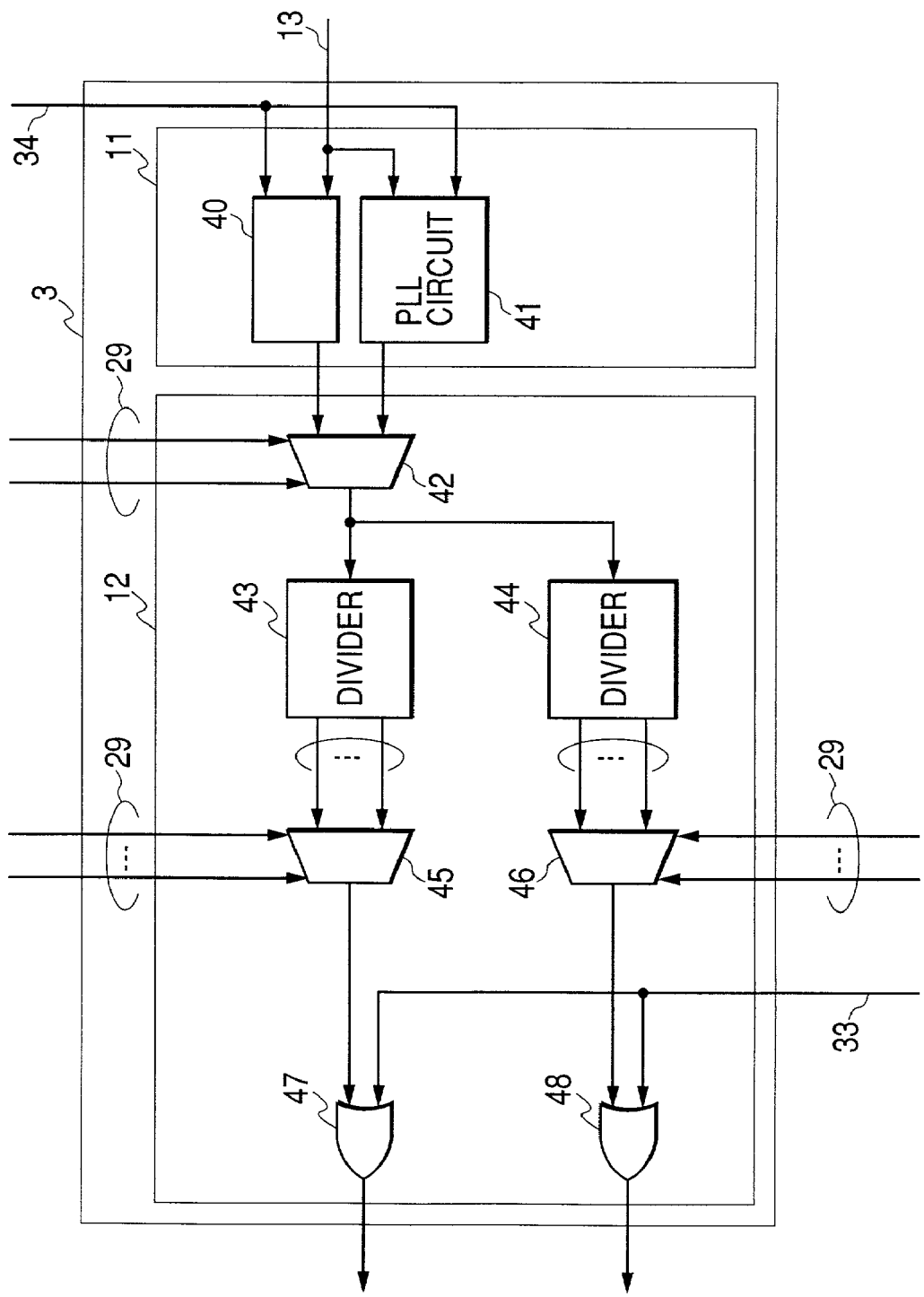
FIG. 2 is a block diagram showing an example of a clock pulse generator.

FIG. 2 shows an example of the clock pulse generator 3. The frequency multiplier-frequency divider circuit 11 has a frequency divider 40 and a PLL (phase-locked loop) circuit 41. When the frequency divider 40 sets the frequency of the source clock signal 13 in half and adjusts a clock duty to 50% when the source clock signal 13 is internally supplied without using the PLL circuit 41. The PLL circuit 41 multiplies the source clock signal 13. A frequency multiplication rate is instructed by a control register not illustrated. The suspend-permission of the frequency division-frequency multiplication operation of the frequency divider 40 and the PLL circuit 41 is controlled with the control signal 34.

The clock selection circuit 12 includes a selector 42, frequency dividers 43, 44, selectors 45, 46, and clock output circuits 47, 48. The selector 42 selects the output of the frequency divider circuit 40 or the output of the PLL circuit 41. The frequency dividers 43, 44 frequency-divide the output cycle of the selector 42 into multiple types and the selectors 45, 46 select the frequency division clock signal in accordance with a control signal. Although the clock output circuits 47, 48 are not restricted in particular, they are constituted by an OR gate and output the clock signals that the selectors 45, 46 output according to the low level of the control signal 33 as the synchronizing clock signals CK1, CK2. When the control signal 33 is at the high level, the clock output circuits 47, 48 steadily output low levels and suppress the output of the clock signals CK1, CK2. Needless to say, the clock output circuits 47, 48 adopt other logic gates.

Figures 3, 4:
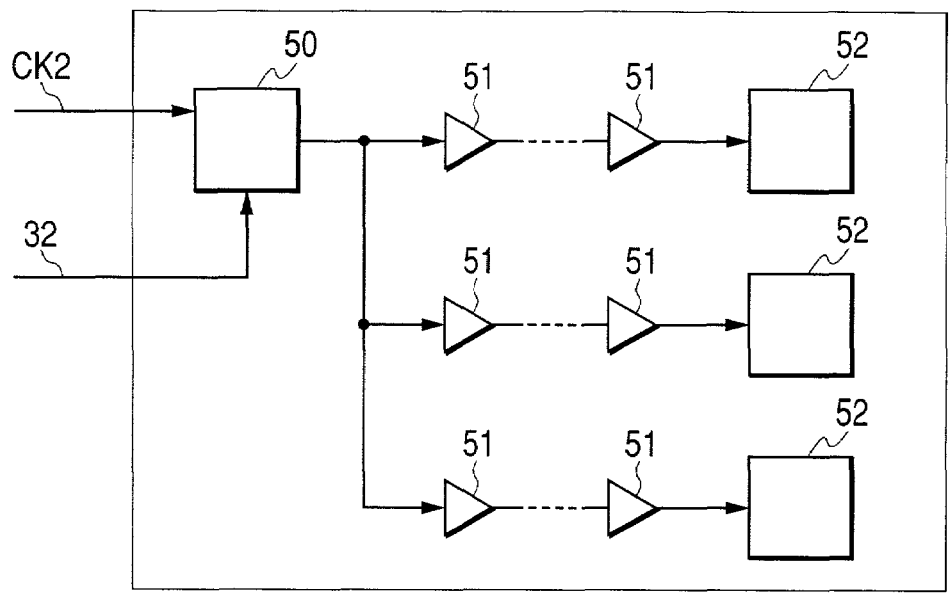
FIG. 3 is a block diagram for illustrating a clock input system of a CPU 2.
FIG. 4 is an explanatory drawing for illustrating the relationship between a set value of a control register and a low power consumption mode in a clock control circuit.

FIG. 3 illustrates a clock input system of the CPU 2. The synchronizing clock signal CK2 supplied externally is input to a clock input circuit 50 and supplied to various flip-flop circuits (FF) 52 from here via a clock driver 51. The control signal 32 is supplied to the clock input circuit 50 and controls the input permission and stop of the clock signal 32. Although the illustration is omitted, the timer 6, interrupt control circuit 6, and built-in peripheral circuit 7 include also a clock input circuit in the same manner, and control the permission-stop of the clock input with the control signals 35, 36, 37.

FIG. 4 illustrates the relationship between a set value of a control register and a low power consumption mode. The low power consumption mode is determined in accordance of setting states of a standby bit SBY and a light standby bit LTSBY assigned to the control register 31 when the CPU 2 executes a sleep instruction. For example, the low power consumption control logic 30 sets the sleep mode in response to a first state (SBY=0, LTSBY=0) of the control register 31 when the CPU 2 executes the sleep instruction and sets the light standby mode in response to a second state (SBY=0, LTSBY=1) of the control register 31 when the CPU 2 executes the sleep instruction, then sets the standby mode in response to a third state (SBY=1, LTSBY=0 or SBY=1, LTSBY=1) of the control register when the CPU 2 executes the sleep instruction.

Figure 5:
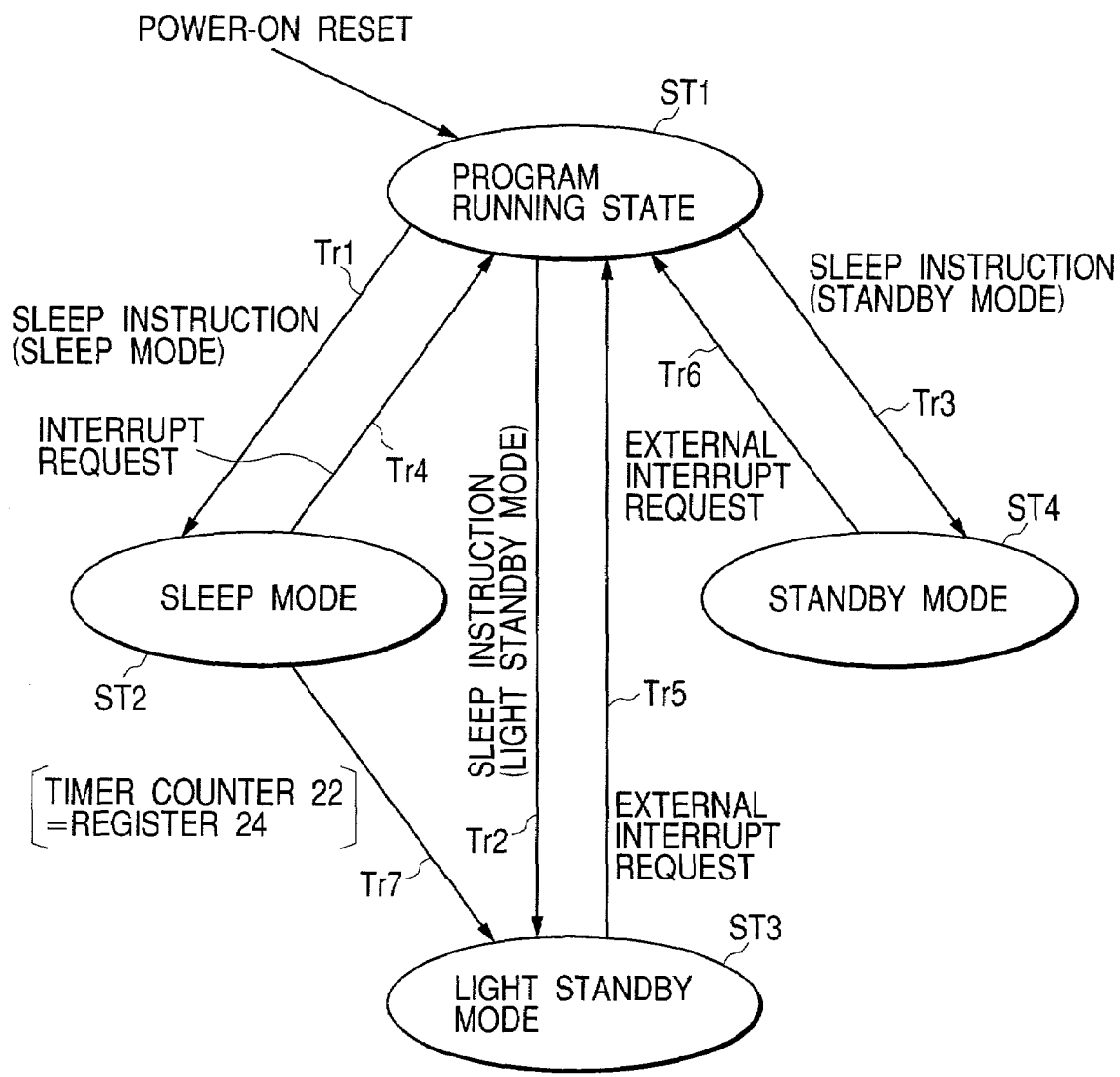
FIG. 5 is an explanatory drawing for illustrating the state transition between a program running state and the low power consumption mode.

FIG. 5 illustrates the state transition between a program running state and a low power consumption mode. The data processor 1 enters a program running sate ST 1 by power-on reset. In this program running state, the frequency multiplier-frequency divider circuit 11 is operated and the clock signals CK1, CK2 of a frequency selected by the selection circuit 12 are supplied to the CPU 2, mode control circuit 4, timer 5, interrupt control circuit 6, and built-in peripheral circuits 7. The CPU 2 fetches an instruction and can execute the instruction.

The transition into a sleep mode ST 2, a light standby ST 3, or a standby mode ST4 is enabled (TR 1, TR 2, TR 3) as described in FIG. 4 when the CPU 2 previously sets the control bits SBY, LTSBY of the control register 31 and executes a sleep instruction. In the sleep mode ST2, because a built-in circuit excluding the CPU 2 can be operated, the transition from the sleep mode ST2 to the program running state ST1 is also enabled by any request of an internal interrupt or external interrupt. To the contrary, the transition from any operation mode of the light standby mode ST3 or standby mode ST4 in which the operation of an internal circuit module that becomes an internal interrupt request generating source to the program running state ST1 is enabled by the external interrupt request. The external interrupt request also contains a hardware reset request. Because the circuit portion that responds to an interrupt request signal operates asynchronously to a clock signal in the interrupt control circuit 6 and the low power consumption control logic 30, response processing can be performed to an interrupt request even when the input of the synchronizing clock signals CK1, CK2 is stopped.

The transition into a program running state by the interrupt request differs in control depending on whether the interrupt request can be masked or not. Only when an interrupt priority order and an interrupt mask state are decided to the maskable interrupt request signals 14B, 15B by the interrupt control circuit 6, it is settled that the interrupt request is accepted. Accordingly, in this case, the interrupt control circuit 6 instructs the transition control (Tr4, Tr5, or Tr6) from the current operation mode to the program running state to the low power consumption control logic 30 with a signal 27 when this interrupt is accepted to the maskable interrupt request signals 14B, 15B. On the other hand, the low power consumption control logic 30 directly receives the interrupt request and performs the transition control of Tr4, Tr5, or Tr6 in parallel to the processing by the interrupt control circuit 6 to the non-maskable interrupt request signals 14A, 15A.

In the light standby mode ST3, the frequency multiplication and frequency division operation of the frequency multiplier-frequency divider circuit 11 are not suspended. In the standby mode, the frequency multiplication and frequency division operation of the frequency multiplier-frequency divider circuit 11 are suspended. Accordingly, the reset of the light standby mode ST3 differs from the reset of the standby mode ST4, and the CPU 2 can intermediately enter the program running state ST1 without securing the stabilization time in the frequency multiplication and frequency division operation of the frequency multiplier-frequency divider circuit 11. In short, the CPU 2 can immediately start the execution of an instruction.

At this time, the low power consumption control logic 30 moves the sleep mode ST2 to the light standby mode ST3 when there is no operation instruction, for example, an interrupt request to the CPU 2 until the predetermined lapse of time after the sleep mode 1 is set. Accordingly, when a data processor operates for a fixed time is not operated, the data processor is automatically moved to a light standby mode and can decrease power consumption. Moreover, even in that case, a more rapid transition into a program running state is guaranteed than the case of a standby mode. As a specific aspect, the predetermined lapse of time is posted with the count-up signal 25 based on the counting operation up to a predetermined value by the timer 5. For example, according to the configuration of the timer 5 of FIG. 1, the CPU 2 sets the data of value 1 for the register 23 intermediately before the execution of a sleep instruction and sets the data of a compared value for the register 24, then starts the counter operation using the adder 20. When the counted value by the counter operation reaches the set value of the register 24 after the sleep mode is set, the count-up signal 25 is enabled. Accordingly, the low power consumption control logic 30 performs control so that the sleep mode ST2 will be moved to the light standby mode ST3 (Tr7). When an interrupt request is made before the count-up signal 25 is enabled, the low power consumption control logic 30 ignores the change of the signal 25. Otherwise, at that time, the counter of the timer 5 ought also be initialized.

FIG. 6 shows an example in which the effect of the low power consumption according to a light standby mode is increased as the data processing by the data processor of FIG. 1 becomes faster. As shown in (A), the data processing is requested for the CPU 2 due to an interrupt at a predetermined interval. If the data processing is requested, as shown in (B), when the data throughput is ordinary, the processing is performed at CPU load and time 2T. As shown in (D), the data throughput is almost the two times, the processing is performed at CPU load 2a and time 2T. Hereupon, the CPU load indicates an amount of processing (number of processing cycles) per unit time, and the power consumption per unit time in the program running state of the CPU 2 is the two times of (B) for (D) This condition appears in an increased amount of power consumption per unit time from a power consumption level in a sleep mode in which the operation of the CPU 2 is suspended as shown in (C), (E). Hereupon, as shown in (C), (E) the power consumption level difference between the sleep mode and light standby mode is defined as P. Finally, if the data processing speed is fast, the necessary data processing time is short. Accordingly, the transition can be moved to the light standby mode faster for that time. When the data processing speed is fast (E), the power consumption is set to 3P·T. When the data processing speed is ordinary (C), the power consumption is 2P·2T, but it is decreased to ¾. Thus, as the data processing becomes faster by the data processor 1, the effect of the low power consumption in the light standby mode is increased.

Figure 7:
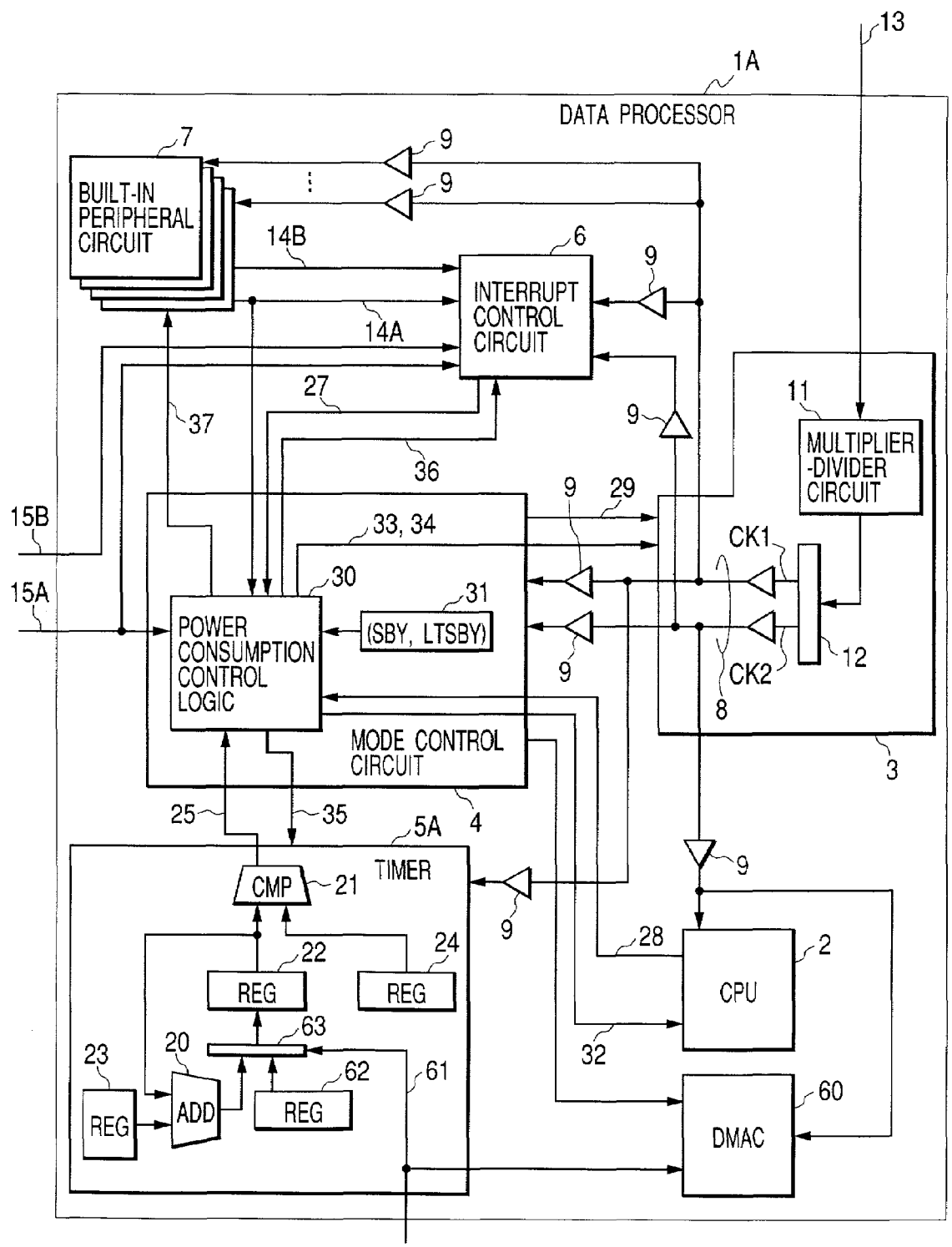
FIG. 7 is a block diagram for illustrating a data processor that builds in a DMAC as a peripheral circuit module.

FIG. 7 shows an example of a data processor 1A that builds in a DMAC (direct memory access controller) 60 as a peripheral circuit module. The DMAC 60 sets a data transfer control condition from the CPU 2 via a data bus of which the illustration is omitted. For example, when a transfer request is externally made to the DMAC 60 with a DMA transfer request signal 61, a bus right is acquired and data transfer control is started. The data transfer control by the DMAC 60 can also be executed in a sleep mode if the CPU 2 already sets a data transfer control condition. Hereupon, as shown in FIG. 5, even when the counter operation for automatically moving from the sleep mode to a light standby mode is performed using a timer, a timer 5A initializes a counted value in response to a DMA transfer request for the DMAC on the way to the counting operation up to a predetermined value, suppresses substantial counting, restarts the counting after the DMA transfer, and moves to the light standby mode so that the data transfer that responds to the DMA transfer request can be completed. That is, the timer 5A is newly provided with a register 62 and a selector 63. While the CPU 2 stores value-0 data in the register 62 and the DMA transfer request is enabled with the DMA transfer request signal 61, the selector 63 is made to select the value-0 data of the register 62, and, in the meantime, a comparison result by the comparator 21 is mismatched. Accordingly, while the DMA transfer is operating, the signal 25 is forcibly maintained in a disable state and the transition into the light standby mode is suppressed. When the DMA transfer control is completed and the signal 61 is disabled, the selector 63 selects the output of the adder 20 and restarts the counter operation from an initial value again.

Besides, another configuration of the data processor 1A of FIG. 7 is the same configuration as FIG. 1. A detailed description is omitted by affixing the same symbols as the drawing.

Figure 8:
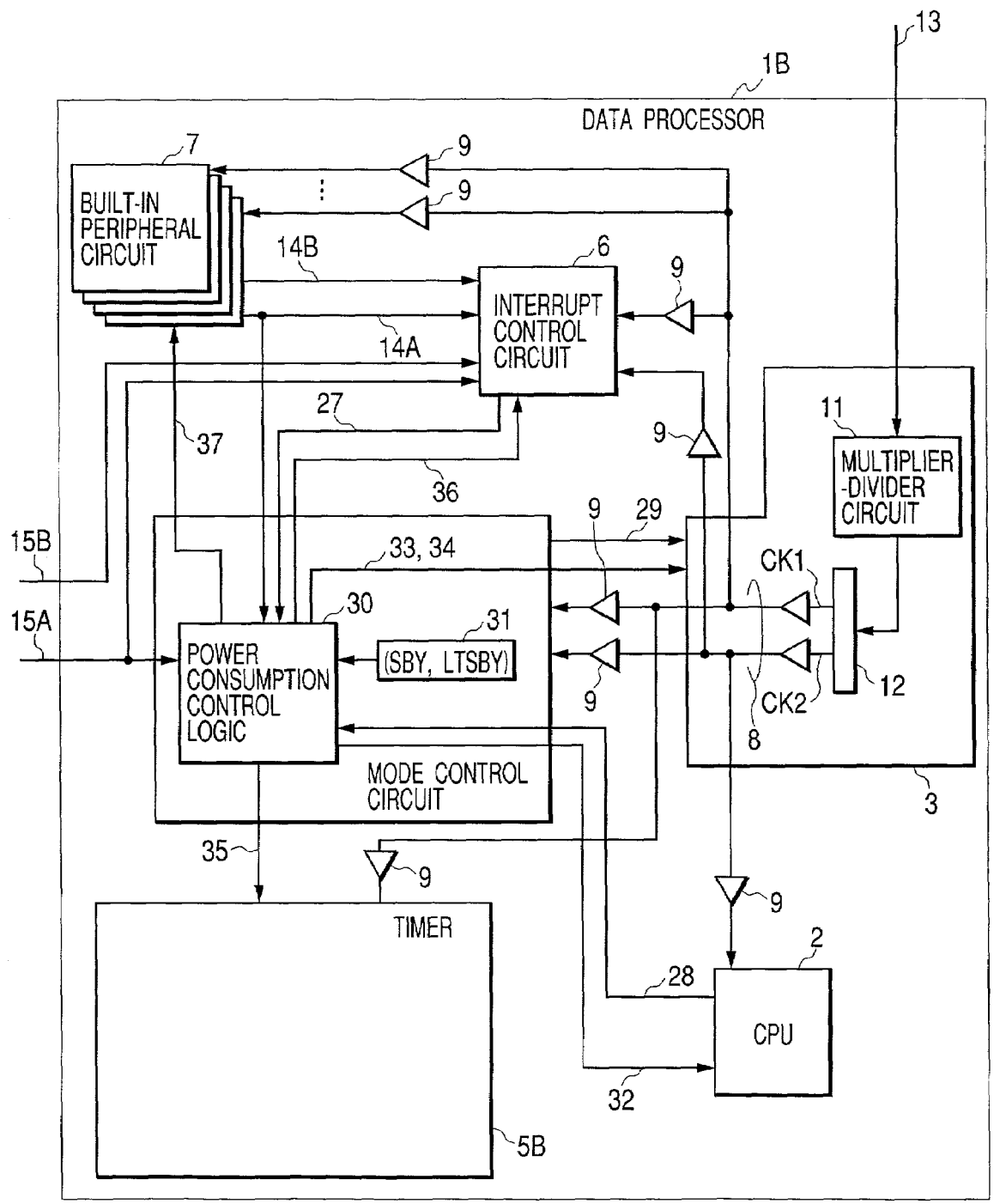
FIG. 8 is a block diagram for illustrating a data processor that does not adopt an automatic transition from a sleep mode to the light standby mode.

FIG. 8 illustrates a data processor 1B that does not adopt an automatic transition from the sleep mode to the light standby mode described in FIG. 5. In short, even if a timer 5B is provided as one of peripheral circuits, the count-up signal 25 described in FIGS. 1, 2 is not supplied to the low power consumption control logic 30. Accordingly, the transition from a low power consumption mode to a program running state in this data processor 1B is performed only by an interrupt request, and the Tr7 transition control of FIG. 5 is not performed.

Figure 9:
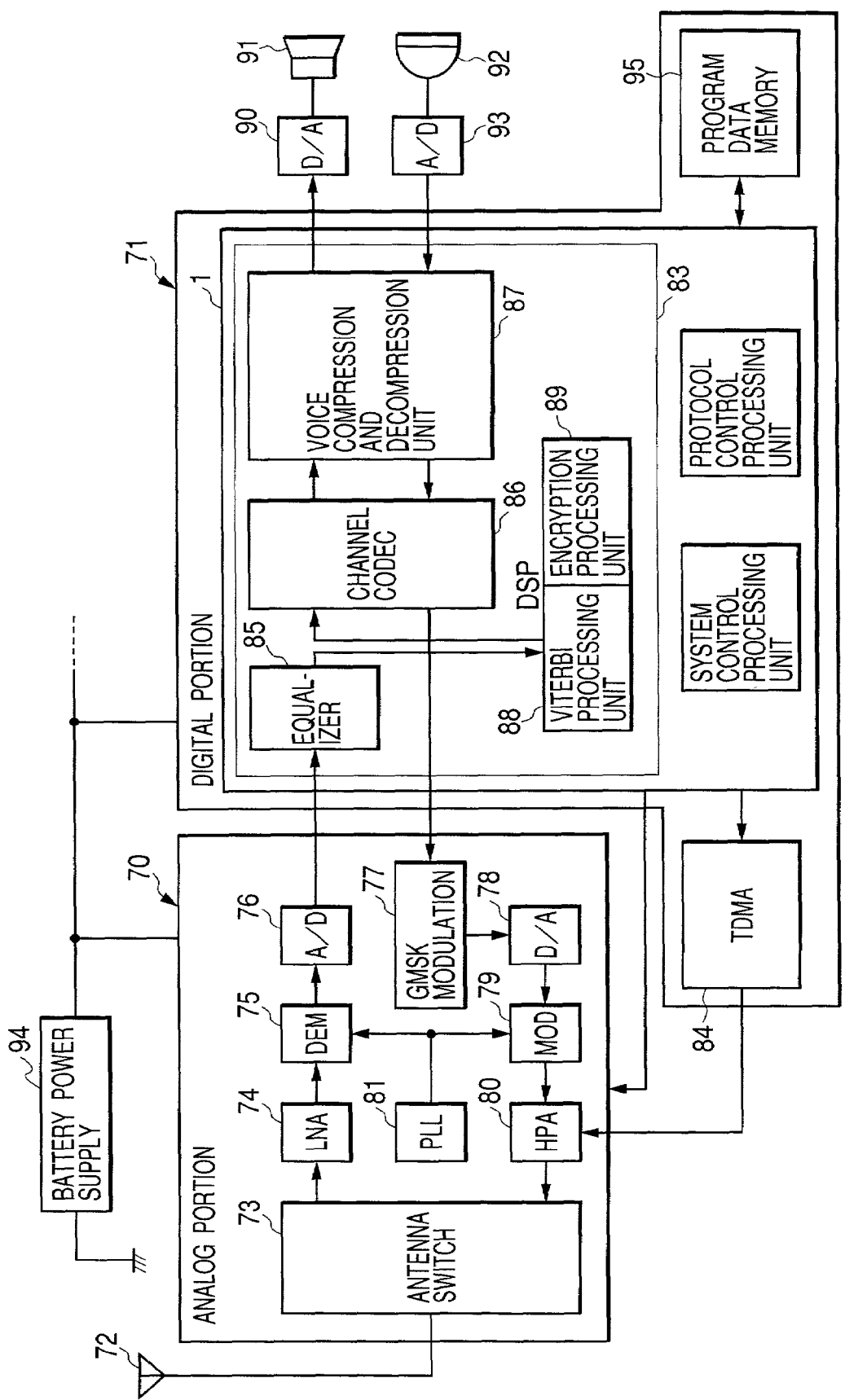
FIG. 9 is a block diagram of a cellular phone system to which the data processor of FIG. 1 applies.

FIG. 9 shows a block diagram of a cellular phone system to which the data processor of FIG. 1 applies, for example. The cellular phone system uses a battery power supply 94 as an operating power supply and is roughly classified into an analog portion 70 and a digital portion 71. In the analog portion 70, an antenna switch 73 as a duplexer is connected to an antenna 72 and a high frequency noise is removed from a high frequency signal received by the antenna 72 by a low noise amplifier (LNA) 74. A signal detected by a detection-decoding circuit (DEM) is decoded and converted to digital data by an A/D converter 76, then assigned to the digital portion 71. The digital send data assigned from the digital portion 71 is not restricted in particular, but it is modulated by a GMSK (Gaussian filtered minimum shift keying) modulation circuit 77 and converted to an analog signal by a D/A conversion circuit 78. The converted analog signal is encoded by an encoding circuit (MOD) 79. The encoded signal is amplified into a high frequency signal by a high frequency amplifier (HPA) 80 and sent from the antenna 72. The encoding circuit (MOD) 79 and the detection-decoding circuit (DEM) 75 are synchronously operated with a clock signal generated by a PLL circuit 81.

The digital portion 71 is not restricted in particular, but it includes a time division multiplexing access control unit (TDMA) 84, the data processor 1, and a program data memory 95. The data processor 1 is provided with a digital signal processing unit 83, a system control processing unit as a function implementing means, and a protocol control processing unit of which the illustrations are omitted in FIG. 1. The digital signal processing unit (DSP) 83 comprises an equalizer 85, a channel codec 86, a voice compression and decompression unit 87, a Viterbi processing unit 88, and an encryption processing unit 89 using a product-sum operation circuit of which the illustration is omitted and the operation program. The equalizer 85 equalizes the output of the A/D converter 76 and the Viterbi processing unit 88 decides a logic value for the equalized data. A decision result is assigned to the channel codec 86 and converted into a predetermined format, then decompressed by the voice compression and decompression unit 87. The decompressed data is issued from a speaker 91 via a D/A converter 90 as sound. The voice input to a microphone 92 is converted to digital voice data by an A/D converter 93 and compressed by the voice compression and decompression unit 87. Subsequently, it is converted to a predetermined format via the channel codec 86 and assigned to the GMSK modulation circuit 77.

The data processor 1, in conversation, controls the operation of the analog portion 70 and the digital portion 71 in real time and performs equalization processing, encoding processing, decoding processing, and encryption processing. Further, the data processor 1 performs protocol control processing and system control processing that are peculiar to mobile communications. The protocol control processing decides whether a local cellular phone system belongs to which talking area in conversation and terminating wait and changes a base station that manages the talking area. The system control processing detects an instruction that corresponds to the change of the console button of the cellular phone system and controls the display of a display unit. Thus, the data processor 1 performs the data processing that corresponds to the generation of various events, such as the waiting, sending, receiving, and button operation of the cellular phone. The generation of an event that requires such data processing is posted to the CPU 2 by an interrupt request, for example. Further, when no data processing is required, the CPU 2 executes a sleep instruction and ought to set a power consumption mode.

FIG. 10 illustrates the transition progress of the operating state of the data processor 1 that changes in response to the operating state of a cellular phone system. (A) of FIG. 10 shows the receiving timing of voice data by a cellular phone system, and received data is supplied to the digital portion 71 via the A/D 76. The external interrupt request signals IRQe (15 A, 15 B) are sent (t1, t3) from the analog portion 70 to the data processor 1 in accordance with the A/D conversion of the received data. Accordingly, a serial interface circuit (serial I/F) that is one of the built-in peripheral circuits 7 of the data processor 1 performs input operation. After the serial interface circuit performs the input operation, it generates (t2, t4) the internal interrupt request signals IRQi (14A, 14B) and issues a command for making the DSP 83 execute the processing of equalization and decoding for input data of the serial interface circuit to the CPU 2. The serial interface circuit also performs the data processing of addressing operation for assigning the input data to the data memory or data register of the DSP 83. The increase and decrease of a load accompanied by the data processing of the CPU 2 is illustrated in (C). At this time, (E) illustrates the transition progress of the operation mode in the data processor 1 having the light standby mode ST3 and a change of power consumption that corresponds to it. On the other hand, (D) illustrates the transition progress of the operation mode in the data processor not having the light standby mode ST3 (having the program running state ST1, sleep mode ST2, and standby mode ST4) and a change of power consumption that corresponds to it as a comparison example.

In the case of (D) according to a comparison example, the data processor in the standby mode ST4 at period T1 enters the program running state ST1 at period T2, and, subsequently, moves to the sleep mode ST2 (period T3). If the internal interrupt request signals IRQi are provided in this state, the data processor moves to the program running state ST1 and makes a CPU be capable of processing the input data of the serial interface circuit (period T4). After the processing, the CPU executes a sleep instruction and the data processor moves to the sleep mode ST2 again (period T5) and waits for the input of the next received data. Thus, when the light standby mode ST3 is not provided, the data processor alternately moves between the program running state ST1 and the sleep mode ST2 when it receives voice data.

To the contrary, when the light standby mode ST3 is used (E), after the data processor 1 in the standby mode ST4 at period T1 enters the program running state ST1 at period T2, it moves to the light standby mode ST3 and waits for the generation of an external interrupt request signal (period T3A). When the external interrupt request signal IRQe that synchronizes with the time t1 is generated, the data processor 1 once moves to the program running state ST1 in response to this signal and executes a sleep instruction for moving to the sleep mode (period T3B), then moves to the sleep mode ST2. If the internal interrupt request signals IRQi are provided in this state, the data processor 1 moves to the program running state ST1 and makes the CPU 2 be capable of processing the input data of the serial interface circuit (period T4). After the processing, the CPU 2 executes the sleep instruction. The data processor 1 moves to the light standby mode ST3 again and waits for the input of the next received data. Thus, when the light standby mode ST3 is provided, the data processor 1 moves between the program running state ST1, light standby mode ST3, and sleep mode ST2 when it receives voice data. Besides, in the operation description of FIG. 10, the supply of a clock signal to the timer 5 is stopped. The operation of FIG. 10 is also the same operation as a cellular phone system that adopts the data processors 1A, 1B of FIGS. 7 and 8.

As evident from (E) of FIG. 10, the processing periods T3B, T5B, . . . for the transition into a light standby mode are considerably shorter than the preceding periods T3A, T5A, . . . . Accordingly, the decrease of the power consumption according to the periods T3A, T5A, . . . in the light standby mode increases remarkably in comparison with the increase of the power consumption amount according to the periods T3B, T5B, . . . in the program running state. Consequently, a cellular phone system that adopts a data processor having the light standby mode ST3 can remarkably decrease power consumption in comparison with the case where a data processor not having the operation mode is used.

The data processor and the application system described above can obtain the following working effects.

1. In the light standby mode ST3, the transition of the CPU 2 into the instruction executable state ST1 is more rapid than in the standby mode ST4 in which changes of the synchronizing clock signals CK1, CK2 inside a data processor are all stopped and the frequency multiplication-frequency division operation in the clock pulse generator 3 is also suspended, and, moreover, power consumption can further be decreased than in the sleep mode ST2 in which only the operation of the CPU 2 is suspended. Therefore, the data processors 1, 1A, or 1B can satisfy both requests of the rapid transition between a low power consumption state and an operating state and low power consumption.

2. The mode control circuit 4 moves the sleep mode ST2 to the light standby mode ST3 when there is no operation instruction to the CPU 2 and the DMAC 60 until the predetermined lapse of time after the sleep mode ST2 is set. Accordingly, when a data processor is not operated for a fixed time, the power consumption can automatically be decreased. Moreover, because the frequency multiplication-frequency division operation is continued in a light standby mode, the transition into the subsequent operating state is also rapid.

3. If the predetermined lapse of time is obtained by the counting operation up to a predetermined value using a timer, the configuration in which a sleep mode is automatically moved to a light standby mode can easily be realized.

4. If a counted value is initialized in response to the DMA transfer request 61 for the DMAC on the way to the counting operation up to the predetermined value as shown in the timer 5A, substantial counting is suppressed, and the counting is restarted after the DMA transfer so as to move to a light standby mode, the operation mode can be prevented from automatically moving to the light standby mode when the DMAC 60 performs the DMA transfer control in a sleep mode.

5. If the hierarchical clock path 8, such as the H tree, is assumed, when the clock supply to a circuit module is stopped in the light standby mode ST3 and standby mode ST4, the mode control circuit 4 controls the stop of supplying the synchronizing clock signals CK1, CK2 to the CPU and other circuits in the light standby mode ST3 and standby mode ST4 by the suppression of the output operation in the clock output circuits 47, 48 of the clock pulse generator 3. Accordingly, the multiple clock drivers 9 arranged in the clock path, such as the H tree, operate in a light standby state and standby state and can suppress useless power consumption.

6. A data processing system, such as a cellular phone system, that adopts the data processor 1, 1A or 1B can satisfy both requests of the rapid transition from a low power consumption state to an operating state and low power consumption. In particular, this data processing system is convenient for a data processing system that uses the battery power supply 94 as an operating power supply.

The invention made by this inventor is specifically described above based on an embodiment. The present invention is not restricted to it, but, needless to say, it can variously be changed within the scope where it does not deviate from the purpose.

For example, a peripheral circuit module built in a data processor is not restricted to a timer and a serial interface circuit, and can properly be changed. Further, the data processor ought also to contain a CPU and a floating-point unit, and is also provided with an accelerator as a hardware circuit that performs processing by a DSP in view of software. Further, a means that moves the data processor from a low power consumption state to a program executable state is not restricted to an interrupt as a concept that also contains reset and exceptional handling. A response ought also be made to another instruction that needs to operate the CPU. Further, the data processor can widely apply to equipment control of not only a cellular phone system but also other portable terminal units or a printer and a car.

The effect obtained from a typical invention among the inventions disclosed in this application is briefly described as follows:

That is, a data processor includes a first mode, such as a sleep mode, and a second mode, such as a light standby mode. Accordingly, the data processor can satisfy both requests of the fast transition between a low power consumption state and an operating state and low power consumption.

Because a mode control circuit moves a sleep mode to a light standby mode when there is no operation instruction until the predetermined lapse of time after the sleep mode is set, power consumption can automatically be decreased when a data processor is not operated for a fixed time. Moreover, because the frequency multiplication-frequency division operation continues in the light standby mode, the transition into the subsequent operating state is also fast.

If the predetermined lapse of time is obtained by the counting operation up to a predetermined value using a timer, the configuration in which a sleep mode is automatically moved to a light standby mode can easily be realized.

When a DMA transfer request is made on the way to the counting operation up to a predetermined value by the timer, because a counted value is initialized in response to this request, substantial count is suppressed, the counting is restarted after the DMA transfer, and the transition into a light standby mode is performed, the operation mode can be prevented from automatically moving to the light standby mode while a DMAC is performing the DMA transfer control in a sleep mode.

A data processing system that adopts the data processor can satisfy both requests of the fast transition from a low power consumption state to an operating state and low power consumption. In respect of the low power consumption, in particular, this data processing system is convenient for a data processing system that uses a battery power supply as an operating power supply.

What is claimed is:

1. A data processor, comprising:
   a central processing unit which is capable of executing an instruction;
   a clock pulse generator that enables frequency multiplication and frequency division operation to a clock and is capable of outputting a plurality of clock signals:
   a mode control circuit;
   a timer circuit; and
   other circuit modules,
   wherein the data processor has a plurality of operation modes including a standby mode, a light standby mode, a sleep mode, and a program running mode,
   wherein in the program running mode, the central processing unit is capable of executing instructions,
   wherein in the sleep mode, the clock pulse generator operates the frequency multiplication and frequency division operation, stops supplying one of the clock signals to the central processing unit, and supplies the remaining clock signals to said other circuit modules,
   wherein in the standby mode, the clock pulse generator is made to stop operating, to stop supplying the clock signals to the central processing unit and said other circuit modules, and
   wherein in the light standby mode, the clock pulse generator operates the frequency multiplication and frequency division operation, and stops supplying the clock signals to said other circuit modules and the central processing unit,
   wherein the mode control circuit is capable of changing the data processor from the sleep mode to the light standby mode in response to a predetermined value by the timer circuit, and
   wherein the mode control circuit is capable of suppressing the counting in response to a direct memory access transfer request on the way to the counting of up to the predetermined value by the timer circuit.

2. The data processor according to claim 1, further comprising a mode control circuit included in said other circuit modules,
   wherein the mode control circuit has a control register which sets a plurality of states including a first, second and third state,
   wherein the mode control circuit sets the sleep mode in response to a first state of the control register when a predetermined instruction is executed by the central processing unit, sets the light standby mode in response to a second state of the control register when the predetermined instruction is executed by the central processing unit, and sets the standby mode in response to a third state of the control register when the predetermined instruction is executed by the central processing unit.

3. The data processor according to claim 2, wherein the mode control circuit is capable of resetting the sleep mode in response to an interrupt request and changing the data processor to the program running mode.

4. The data processor according to claim 2, wherein the mode control circuit is capable of resetting the light standby mode in response to an external interrupt request and changing the data processor to the program running mode.

5. The data processor according to claim 2, wherein the mode control circuit is capable of resetting the standby mode in response to an external interrupt request and changing the data processor to the program running mode.

6. The data processor according to claim 2,
   wherein the mode control circuit outputs a control signal to a clock input circuit of the central processing unit, and
   wherein the clock input circuit of the central processing unit stops inputting said one of the clock signals thereinto in response to the control signal, in the sleep mode.

7. The data processor according to claim 2,
   wherein the mode control circuit outputs a control signal to a clock output circuit of the clock pulse generator, and
   wherein the clock pulse generator stops outputting the clock signals to the central processing unit and said other circuit in response to the control signal, in the light standby mode.

8. The data processor according to claim 2,
wherein the clock pulse generator includes a PLL circuit that multiplies the frequency of the clock and the frequency divider that frequency-divides the cycle of the clock.

9. The data processor according to claim 1,
wherein the clock pulse generator includes a PLL circuit that multiplies a frequency of the clock and a frequency divider that frequency-divides a cycle of the clock.

10. A data processor, comprising:
a central processing unit that can execute an instruction;
a clock pulse generator that enables frequency multiplication and frequency operation on an input clock and outputs a plurality of clock signals; other circuit modules; and
a mode control circuit that controls settings of first and second modes included in said other circuit modules,
wherein the data processor has a program running mode, a first mode, and a second mode,
wherein in the program running mode, the central processing unit is capable of executing the instruction,
wherein in the first mode, the clock pulse generator is stopped to supply the clock signals to the central processing unit, and the clock pulse generator supplies the clock signals to said other circuit modules,
wherein in the second mode, the clock pulse generator operates the frequency multiplication and frequency division operation, and the clock pulse generator stops supplying the clock signals to the central processing unit and said other circuit modules,
wherein the mode control circuit changes the first operation mode to the second operation mode when there is no operation instruction to the central processing unit until a predetermined lapse of time after the first mode is set,
wherein the predetermined lapse of time is obtained by a counting operation of up to a predetermined value by a timer,
wherein said other circuit modules include a direct memory access controller,
wherein the timer initializes a counted value in response to a direct memory access transfer request to the direct memory access controller in the counting operations,
wherein the mode control circuit is capable of suppressing the counting in response to a direct memory access transfer request on the way to the counting of up to the predetermined value by the timer.

11. The data processor according to claim 10, wherein the mode control circuit includes a control register, and sets the first mode in response to a first state of the control register when a predetermined instruction is executed by the central processing unit, and sets the second mode in response to a second state of the control register when a predetermined instruction is executed by the central processing unit.

12. The data processor according to claim 11, wherein the mode control circuit resets the first mode in response to an interrupt request and changes the data processor to the program running mode.

13. The data processor according to claim 11, wherein the mode control circuit resets the second mode in response to an external interrupt request and changes the data processor to the program running mode.

14. The data processor according to claim 11, wherein the mode control circuit controls the stop of supplying the clock signals to the central processing unit and said other circuit modules in the sleep mode by the stop of the output operation in the clock input circuit of the central processing unit.

15. The data processor according to claim 11, wherein the mode control circuit controls the stop of supplying the clock signals to the central processing unit and said other circuit modules in the light standby mode by the stop of the output operation in the clock output circuit of the clock pulse generator.

16. The data processor according to claim 11, wherein the clock pulse generator includes a phase-locked loop circuit that multiplies a frequency of a clock signal and a frequency divider that frequency-divides a cycle of the clock signal.

17. The data processor according to claim 10, wherein the mode control circuit is capable of controlling the stop of supplying the clock signals to the central processing unit in the sleep mode by the suppression of input operation in a clock input circuit of the central processing unit.

18. The data processor according to claim 10, wherein the mode control circuit controls the stop of supplying the clock signals to the central processing unit and said other circuit modules in the light standby mode by the stop of output operation in a clock output circuit of the clock pulse generator.

19. The data processor according to claim 10, wherein the clock pulse generator includes a phase-locked loop circuit that multiplies a frequency of the clock signals and a frequency divider that frequency-divides a cycle of the clock signals.

20. A data processing system, comprising:
a data processor including a central processing unit that can execute an instruction; a clock pulse generator that enables frequency multiplication and frequency operation on an input clock and outputs a plurality of clock signals; other circuit modules; a mode control circuit that controls settings of first and second modes included in said other circuit modules; and a timer circuit, the mode control circuit being capable of changing the data processor from the sleep mode to the light standby mode in response to a predetermined value by the timer circuit;
a memory which is accessed by the central processing unit of the data processor; and
a circuit that requests an interrupt to the data processor,
wherein the data processor has a program running mode, a first mode, and a second mode,
wherein in the program running mode, the central processing unit is capable of executing the instruction,
wherein in the first mode, the clock pulse generator is stopped to supply the clock signals to the central processing unit, and the clock pulse generator supplies the clock signals to said other circuit modules,
wherein in the second mode, the clock pulse generator operates the frequency multiplication and frequency division operation, and the clock pulse generator stops supplying the clock signals to the central processing unit and said other circuit modules,
wherein the mode control circuit changes the first operation mode to the second operation mode when there is no operation instruction to the central processing unit until a predetermined lapse of time after the first mode is set, and
wherein the mode control circuit is capable of suppressing the counting in response to a direct memory access transfer request on the way to the counting of up to the predetermined value by the timer circuit.

21. The data processing system according to claim 20, wherein the data processing system operates with a battery power supply.

22. A data processing system, comprising:
- a data processor including a central processing unit that can execute an instruction; a clock pulse generator that enables frequency multiplication and frequency operation on an input clock and outputs a plurality of clock signals; other circuit modules; a mode control circuit that controls settings of first and second modes included in said other circuit modules; and a timer circuit, the mode control circuit being capable of changing the data processor from the sleep mode to the light standby mode in response to a predetermined value by the timer circuit;
- a memory which is accessed by the central processing unit of the data processor can access; and
- a circuit that requests an interrupt to the data processor, wherein the data processor has a program running mode, a first mode, and a second mode,
- wherein in the program running mode, the central processing unit is capable of executing the instruction,
- wherein in the first mode, the clock pulse generator is stopped to supply the clock signals to the central processing unit, and the clock pulse generator supplies the clock signals to said other circuit modules,
- wherein in the second mode, the clock pulse generator operates the frequency multiplication and frequency division operation, and the clock pulse generator stops supplying the clock signals to the central processing unit and said other circuit modules,
- wherein the mode control circuit changes the first operation mode to the second operation mode when there is no operation instruction to the central processing unit until a predetermined lapse of time after the first mode is set,
- wherein the mode control circuit includes a control register, and sets the first mode in response to a first state of the control register when a predetermined instruction is executed by the central processing unit, and sets the second mode in response to a second state of the control register when a predetermined instruction is executed by the central processing unit, and
- wherein the mode control circuit is capable of suppressing the counting in response to a direct memory access transfer request on the way to the counting of up to the predetermined value by the timer circuit.

* * * * *

UNITED STATES PATENT AND TRADEMARK OFFICE
CERTIFICATE OF CORRECTION

PATENT NO. : 7,000,140 B2
DATED : February 14, 2006
INVENTOR(S) : Okubo et al.

It is certified that error appears in the above-identified patent and that said Letters Patent is hereby corrected as shown below:

<u>Title page,</u>
Item [54], Title, delete "DATA PROCESSOR AND DATA PROCESSING SYSTEM" and insert -- DATA PROCESSOR AND DATA PROCESSING SYSTEM WITH MULTIPLE OPERATING MODES --.

Signed and Sealed this

Thirtieth Day of May, 2006

JON W. DUDAS
*Director of the United States Patent and Trademark Office*